US011506587B1

(12) United States Patent
Hashemi et al.

(10) Patent No.: US 11,506,587 B1
(45) Date of Patent: Nov. 22, 2022

(54) LIQUID DROPLET AND SOLID PARTICLE SENSING DEVICE

(71) Applicant: HLM Diagnostics Inc., Toronto (CA)

(72) Inventors: Alireza Hashemi, Tehran (IR); Mehrnoosh Houshmand, Tehran (IR); Anis Mirzaei, Karaj (IR); Hamid Reza Layegh Pour, Rasht (IR)

(*) Notice: Subject to any disclaimer, the term of this patent is extended or adjusted under 35 U.S.C. 154(b) by 0 days.

(21) Appl. No.: 17/852,912

(22) Filed: Jun. 29, 2022

(51) Int. Cl.
*G01N 15/02* (2006.01)
*G01N 15/14* (2006.01)

(52) U.S. Cl.
CPC ..... *G01N 15/0211* (2013.01); *G01N 15/1404* (2013.01); *G01N 2015/1415* (2013.01); *G01N 2015/1486* (2013.01); *G01N 2015/1493* (2013.01); *G01N 2015/1497* (2013.01)

(58) Field of Classification Search
CPC ........... G01N 15/0211; G01N 15/1404; G01N 2015/1415; G01N 2015/1486; G01N 2015/1493; G01N 2015/1497
See application file for complete search history.

(56) References Cited

U.S. PATENT DOCUMENTS

| | | | | |
|---|---|---|---|---|
| 5,085,500 | A | 2/1992 | Blesener | |
| 6,228,652 | B1 * | 5/2001 | Rodriguez | G01N 15/14 436/63 |
| 7,973,929 | B2 | 7/2011 | Bates | |
| 8,009,290 | B2 | 8/2011 | Unger | |
| 8,988,681 | B2 * | 3/2015 | Ashgriz | G01N 15/02 356/28 |
| 9,995,667 | B2 | 6/2018 | Hart et al. | |
| 10,184,880 | B2 | 1/2019 | Godoy et al. | |
| 2009/0323061 | A1 * | 12/2009 | Novotny | G01N 15/1456 977/773 |
| 2014/0234865 | A1 * | 8/2014 | Gabriel | G01N 21/6428 356/338 |
| 2014/0355008 | A1 * | 12/2014 | Ashgriz | G01F 1/74 356/627 |
| 2021/0190663 | A1 * | 6/2021 | Vanmeerbeeck | G03H 1/0866 |
| 2021/0190671 | A1 * | 6/2021 | Vanmeerbeeck | G01N 15/1459 |
| 2022/0099546 | A1 * | 3/2022 | Vaez-Iravani | G01N 15/1463 |

* cited by examiner

*Primary Examiner* — Roy M Punnoose
(74) *Attorney, Agent, or Firm* — Nasser Ashgriz; UIPatent Inc.

(57) ABSTRACT

A liquid droplet and solid particle sensing device is provided that can measure the average droplet size in a spray. The present device uses a swirling flow to draw a particulate or a spry into the device for sizing and counting. The swirling flow is configured to keep all the particles away from the walls of the device and to concentrate them at the center of a flow channel to pass through the center of a light beam for high sensitivity and repeatability of the measurement.

17 Claims, 11 Drawing Sheets

LIQUID DROPLET AND SOLID PARTICLE SENSING DEVICE

FIELD OF THE INVENTION

The present invention is related in general to the field of particle and droplet sizing, and in particular to light scattering method of particle sizing.

BACKGROUND OF THE INVENTION

Spray and particle flows are used in a wide range of industries with a variety of applications, such as in construction, auto & aerospace, pharmaceutical, agricultural/pesticides, cleaning/washing, coating/painting, cooling/conditioning, surface cooling/steel slab, fire protection, humidification, meteorology, dust control, and more. In all of these industries, sprays are mainly designed and used based on experimental measurements. However, having an instrument that can determine spray sizes will significantly reduce iteration cost and provide proper quality control on the final product or process.

In all of these applications, one of the most important parameters is the particle or spray droplet sizes. For instance, in the auto and aerospace industries, fuel sprays are used inside their combustors. In these applications, the size of the droplets in a spray dictates the efficiency of the combustion, as well as the pollution formation. In spray cooling, the cooling rate depends on the droplet size. In cleaning and dust removal, droplet size determines the efficiency of water consumption for cleaning, etc. In the construction application, particle size distribution dictates the quality of the cement, which in turn determines the quality of the concrete.

There are several different particle and droplet size measurement systems. Most of the currently available instruments use one of the following methods for droplet sizing: Laser light scattering, phase doppler, and direct imaging. Among these, laser light scattering is the most commonly used one, since it is simple and can detect very small droplets. Phase doppler method is a very accurate method, however, it is complicated and requires an expert to operate it. Direct imaging is slow and expensive.

The sizing devices can be categorized based on solid particle or liquid droplet sizing devices. Most available devices work only on solid particle. The devices that work on liquid droplets are usually very large and very expensive. The main reason that solid particle sizers do not work on liquid droplets is because they have some internal channels that liquid droplets will collide on when they enter the system and make the measurement not possible. These devices works by drawing a sample of air that contains particles through a beam of light and detecting the light scattered off the particles entrained in the air flow. These particles scatter light in proportion to their size, composition, shape and other physical properties. Lenses, mirrors, or other light collection techniques are used to increase the portion of the scattered light which is focused onto a photoelectric device (hereinafter referred to as a photodetector). The photodetector converts this scattered light into an electrical signal. This electrical signal is typically a pulse whose amplitude is related to the amount of scattered light reaching the photodetector and whose duration is typically related to the transit time of the particle through the beam of light. Thus, from the photodetector output and associated circuitry information about the number and size of particles in a sampled volume of air can be determined.

The more commonly used currently available portable particle sizing/counting systems do not work when applied on liquid droplet flows or sprays. They are designed to measure solid particles. They intake the gas containing solid particles and pass it through a laser beam to determine its size. However, because they have a small flow channel, if a liquid droplet is passed through them, the droplet will collide with the walls of the system and will not be counted and soon damage the system. The devices that measure liquid droplets are usually large and are set outside of the spray flow and non-intrusively measure inside of the spray. This requires large optics and powerful lasers, which are the main costs of these systems.

A spray comprises of millions of droplets. These systems are designed to distinguish each and every droplet in a measuring zone. In order to achieve this, the prior art systems use a large number of detectors that measure the light scattering at different angles to identify different droplet sizes in the measuring zone, or a complex phase shifted measuring system, such as those that use phase doppler anemometry. Such detectors are relatively large and costly.

Typically, a light scattering particle counter draws a sample of air through a beam of light. The particles in this sample flow of air scatter light in proportion to their size, shape and index of refraction. Refractive, reflective, or other light collection techniques are used to enhance the collection of light and focus it onto a photoelectric device. The photoelectric device converts the scattered light into an electrical signal. The created electrical signal is related to the amount of incident light and thus the particle size. Additionally, the signal is typically a pulse, wherein the signal width represents the velocity of the particle and the beam width. By accumulating the pulses over a period of time, the concentration of particles in the sample air flow may be determined.

Therefore, there is a need for a simple, portable device that can measure both particles and droplet sizes in a flowing system.

SUMMARY OF THE INVENTION

The present invention introduces a novel particle and droplet sizer that operated based on light extinction (LE). It is based on measuring the light scattered signal by a few, one or two, droplets passing through a laser beam and analyzing the signal to determine the droplet size.

The present device is small enough so that it can be temporarily held inside a large spray, or around a small spray, to measure droplet sizes. It can measure single droplets at a time. It is located inside a spray, and samples only a small fraction of the spray. A multi-cone system is used to allow for only a few, one or two, droplets to pass through a laser beam. This allows for having a single, small, and simple light detector, significantly reducing size and cost.

One object of the present invention is to have an easy-to-use droplet size measuring device for sprays.

Another object of the present invention is to have a device to monitor the performance of a spray nozzle and spray atomization quality. By regularly characterizing a spray droplet sizes, a nozzle's malfunction can be detected. It provides a quick measure of the droplet size distribution in a spray.

Another object of the present invention is to have a spray sizing device that can measure any type of fluid and solid, including paint, pesticides, fuels, oils, drugs, etc.

BRIEF DESCRIPTION OF THE DRAWINGS

Embodiments herein will hereinafter be described in conjunction with the appended drawings provided to illus- 
trate and not to limit the scope of the claims, wherein like designations denote like elements, and in which:

DETAILED DESCRIPTION OF PREFERRED EMBODIMENTS

One embodiment of the present liquid droplet and solid particles sensing device 100 is shown in FIGS. 1-2A, 2B, 3A, 3B, 3C, 4A, 4B and 4C.

Figure 1:
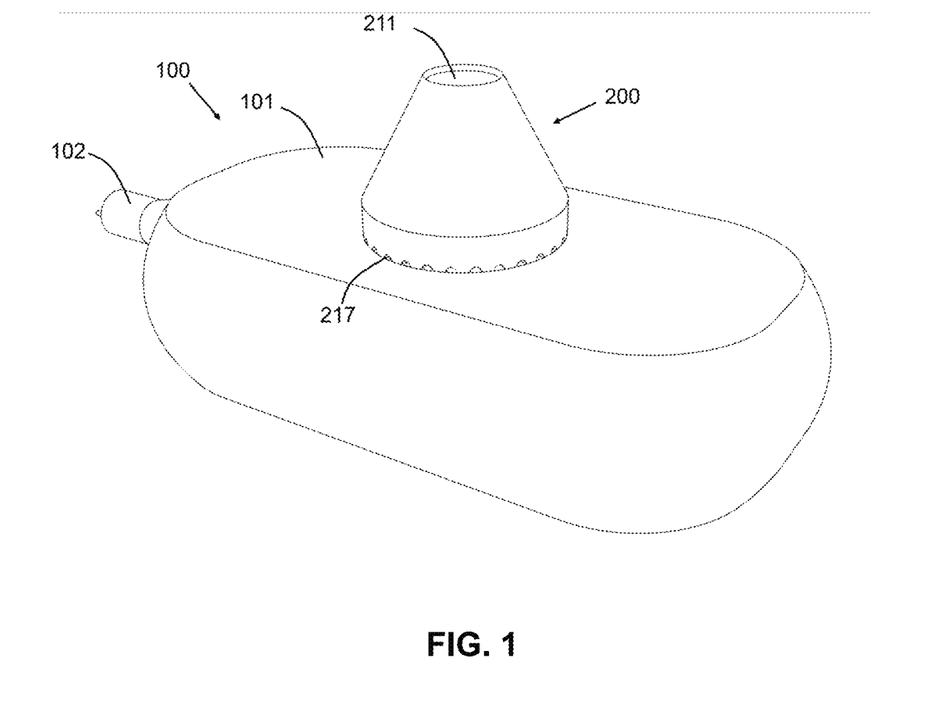
FIG. 1 shows a perspective view of a first embodiment of the present device.
Figure 2A:
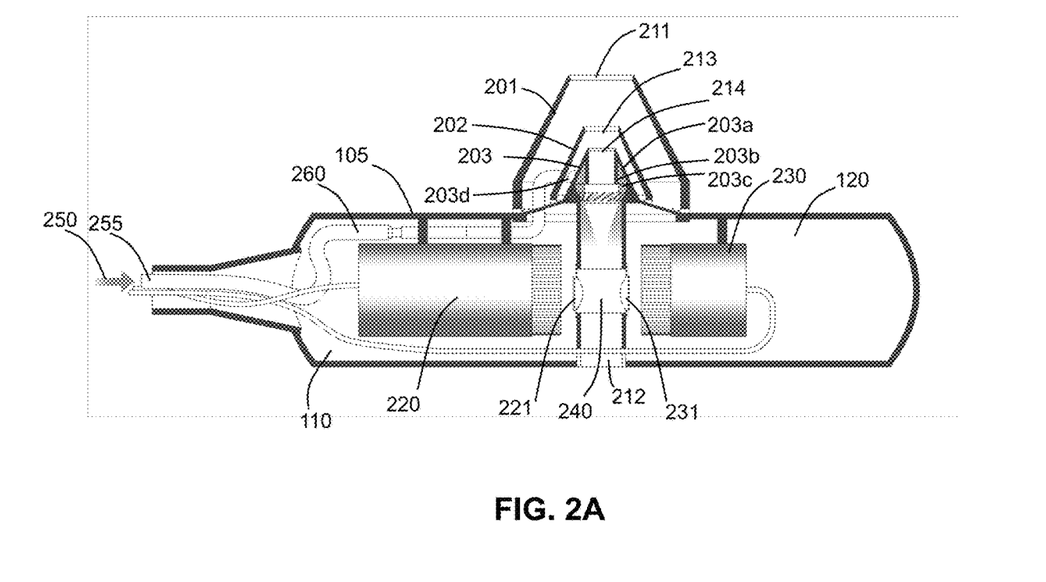
FIG. 2A shows a cross sectional side view of the first embodiment of the device.
Figure 2B:
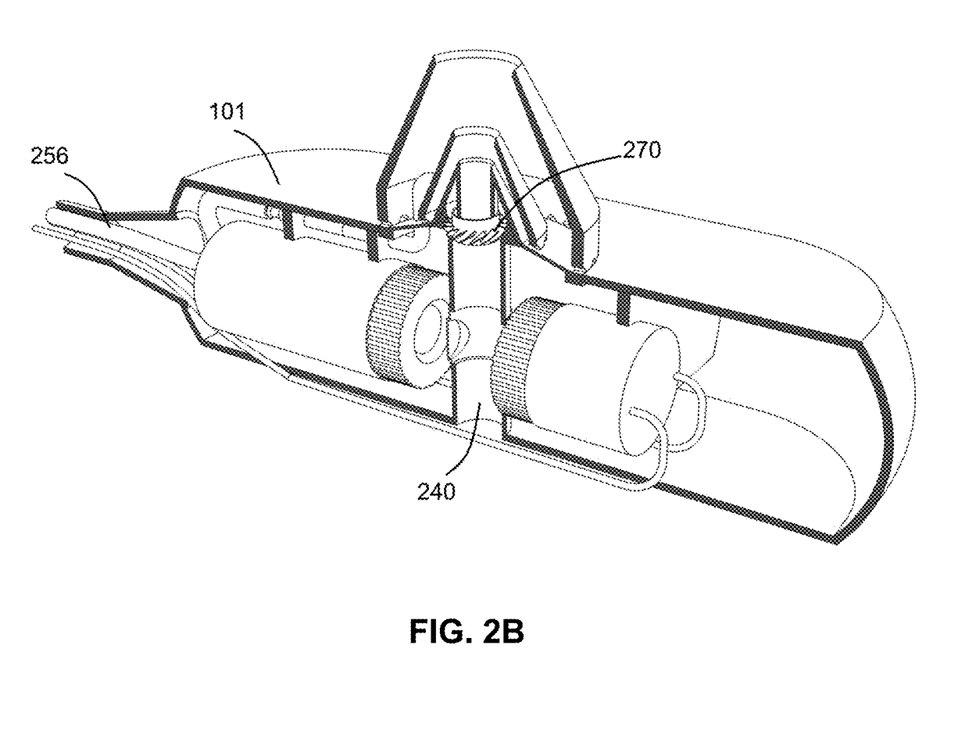
FIG. 2B shows a cross sectional side view of the swirling flow generator inside the cone of first embodiment of the device.

The liquid droplet and solid particles sensing device 100 comprises of a body 101 that has a multi-cone sampler 200 that has an opening 211 and a set of openings 217 at the bottom of the cone 200. An inlet 102 on one side of the device is configured to let electronics as well as air to enter the device. The device 100 is held under a spray or a particle flow and a small section of the flow enters the device 100 through the opening 211 and exits through a bottom opening 212.

The body 101 of the device comprises of a first section 110 to receive a light source 220, preferably a laser light source, a second section 120 to receive a light detector 230, and a channel 240 that is in between the first and second section to allow particles and droplets to flow through the device without colliding with the walls of the channel. The channel has at least a first transparent section 221 aligned in front of the light source 220 to allow the light to go through, and a second transparent section 231 aligned in front of the detector 230 to let the light to reach the detector.

Figure 3A:
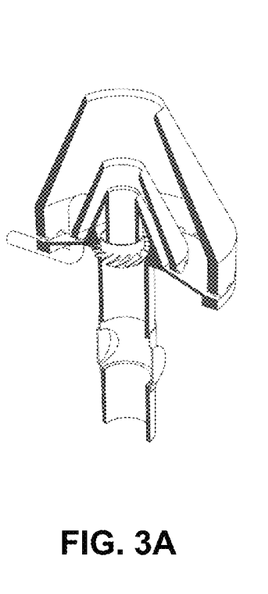
FIG. 3A shows a cross sectional view of the first embodiment of the device with three cones.
Figure 3B:
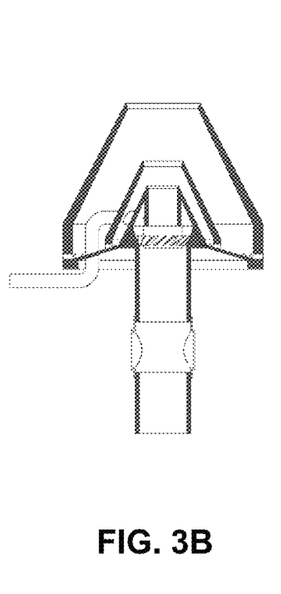
FIG. 3B shows another cross sectional view of the first embodiment of the device with three cones separated from each other.
Figure 3C:
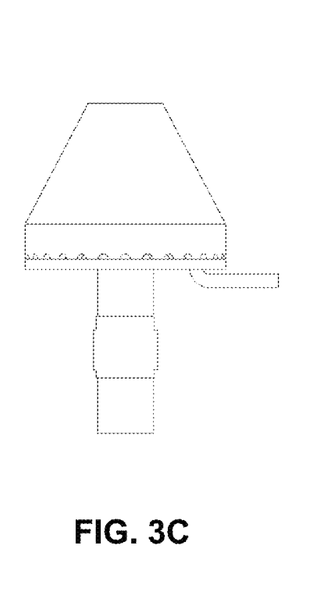
FIG. 3C shows the first embodiment of the device with three cones.
Figure 4A:
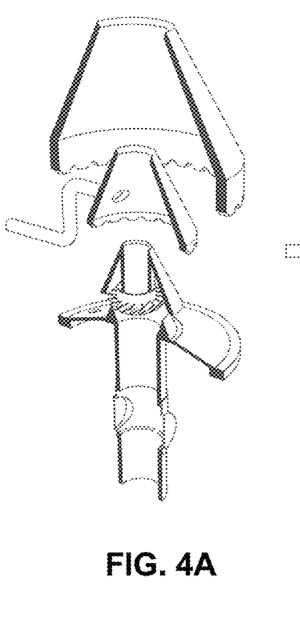
FIG. 4A shows a cross sectional view of the first embodiment of the device with three cones separated.
Figure 4B:
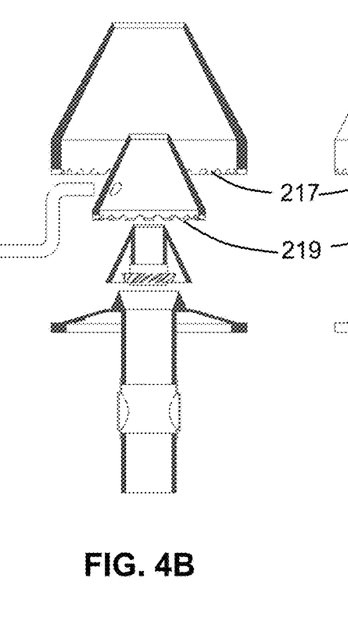
FIG. 4B shows another cross-sectional view of the first embodiment of the device with three cones separated.
Figure 4C:
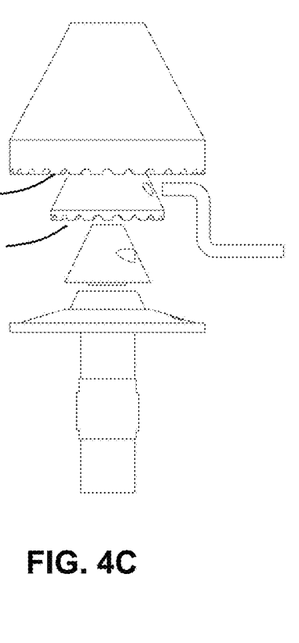
FIG. 4C shows the first embodiment of the device with three cones separated.

The multi-cone system 200 comprises of several cone. In the first embodiment three cones 201, 202, and 203 are used. The larger cone 201 is on top of the middle cone 202, which is on top of the bottom cone 203. Some of the flow is sampled by the device and enters the device through the first opening 211. The middle cone samples some of that flow through its opening 213, and the bottom cone samples of the flow that enters through 213 through its opening 214. Therefore, only a small fraction of the flow enters the channel 240 to pass by the light beam for measurement.

Figure 5:
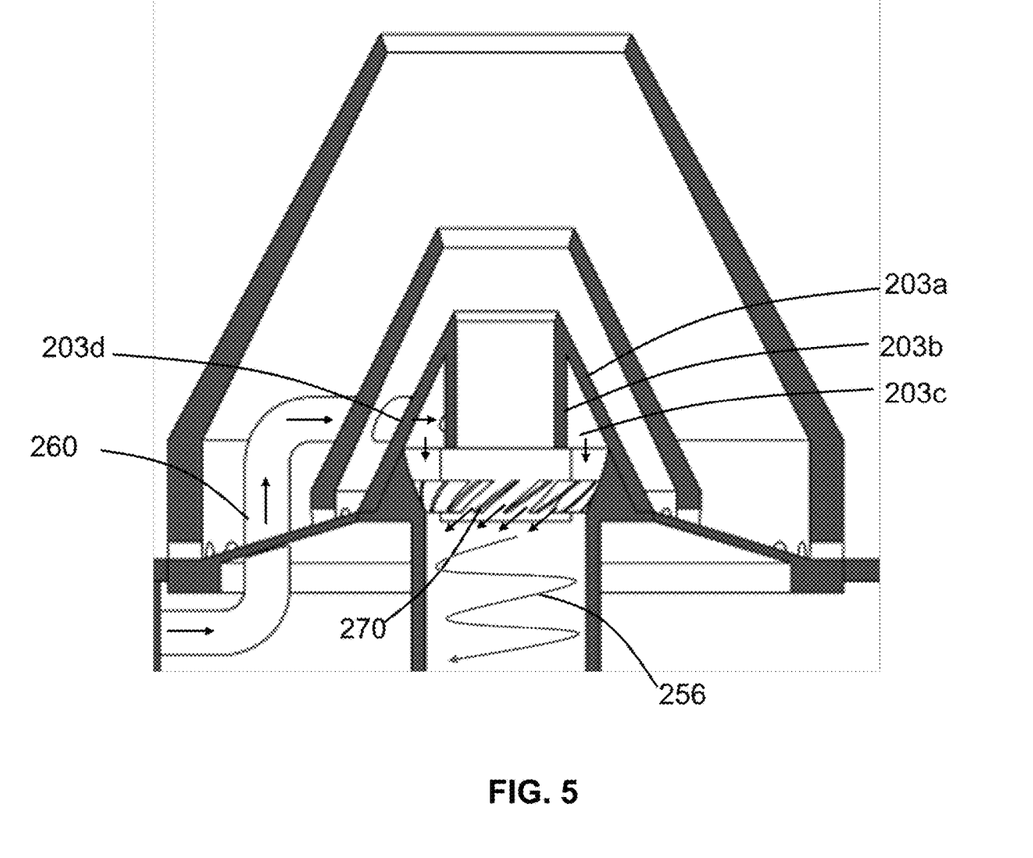
FIG. 5 shows a magnified image of the cross-sectional view of the first embodiment of the device with three cones.
Figure 6A:
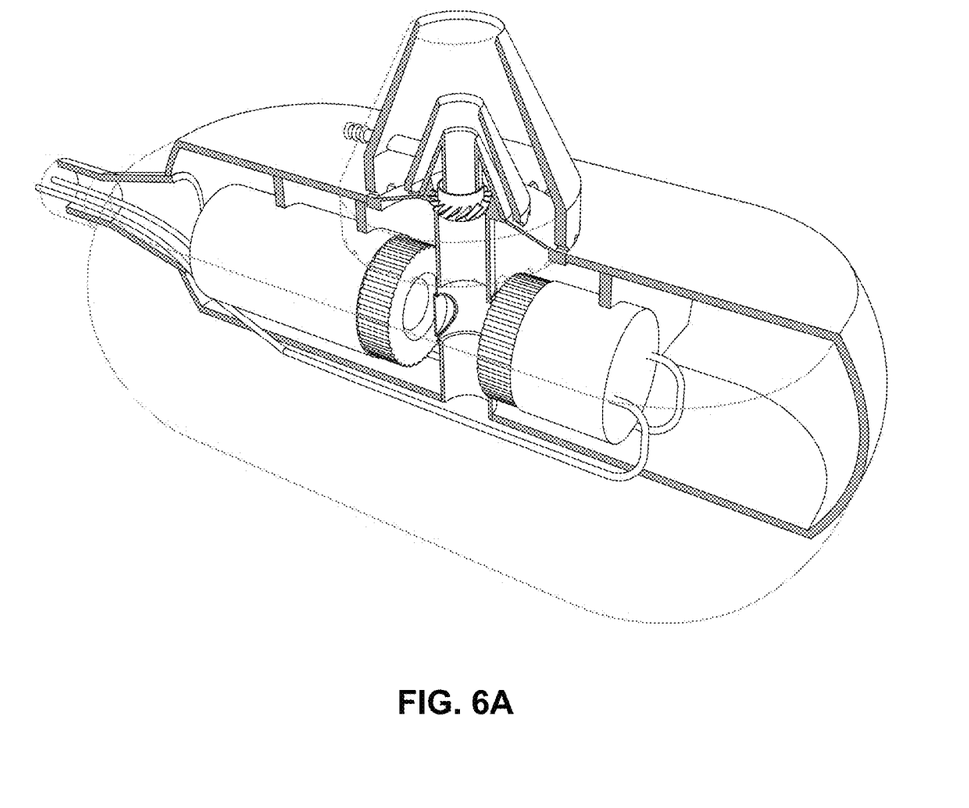
FIG. 6A shows a cross sectional side view of second embodiment of the device with the gas inlet at the outer cone.
Figure 6B:
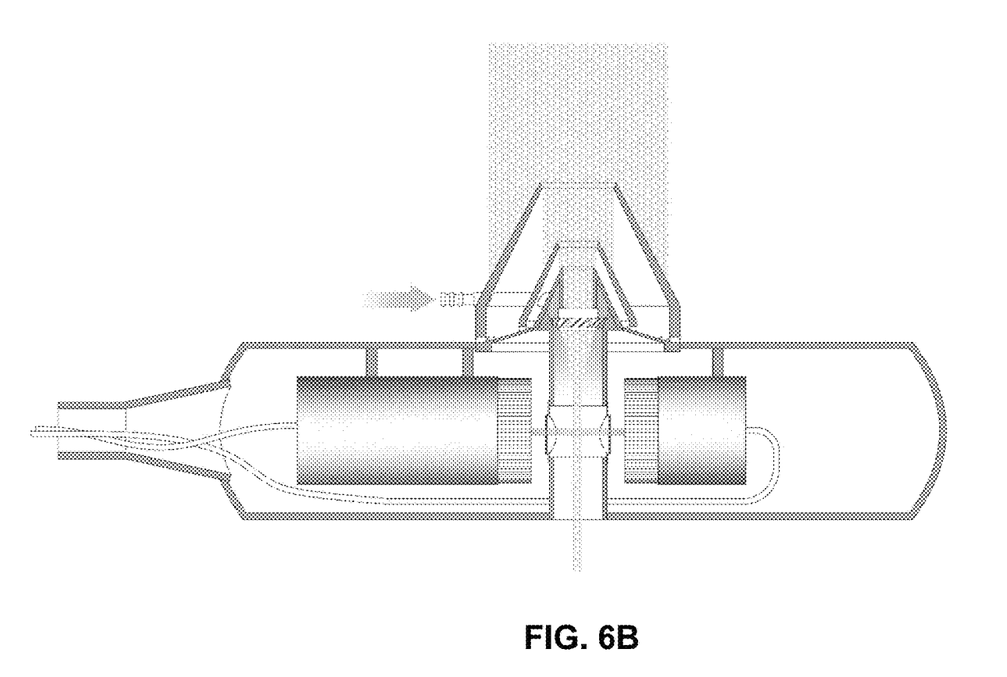
FIG. 6B shows a cross sectional side view of second embodiment of the device with the gas inlet at the outer cone.
Figure 7A:
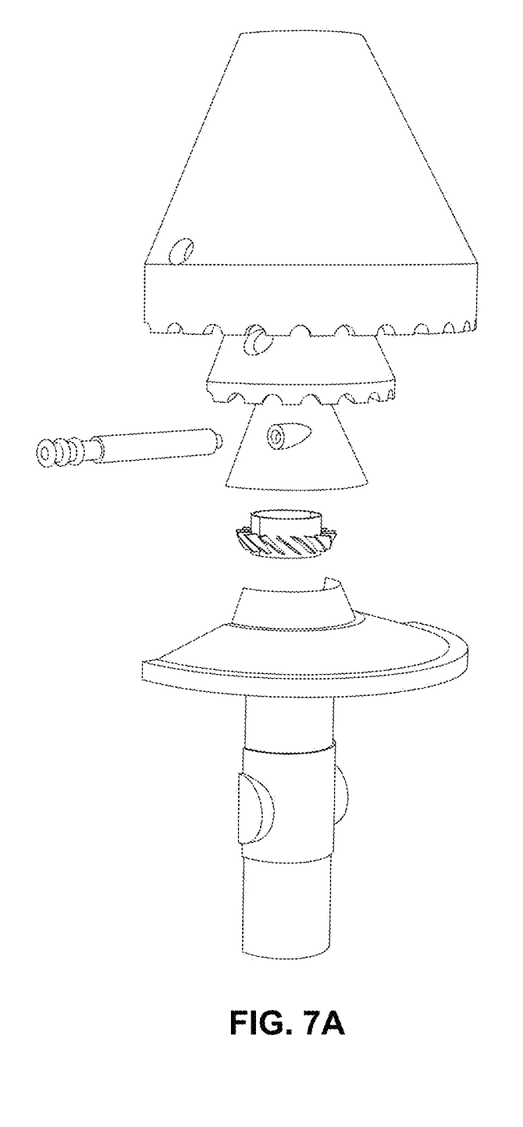
FIG. 7A shows the second embodiment of the device with three cones separated.
Figure 7B:
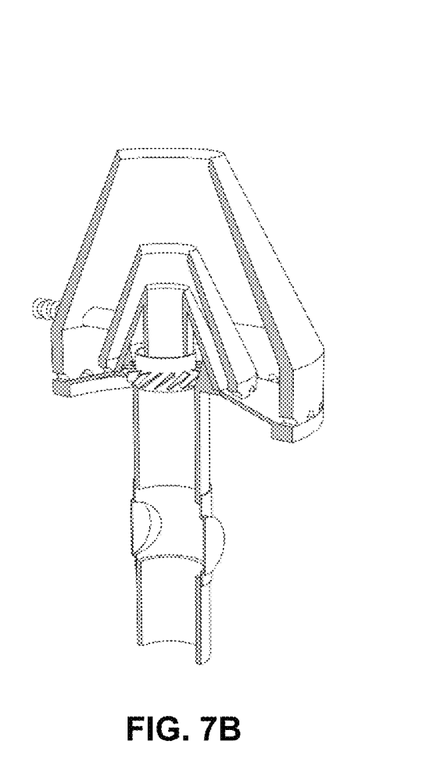
FIG. 7B shows the cross-sectional view of the second embodiment of the device with three cones.
Figure 7C:
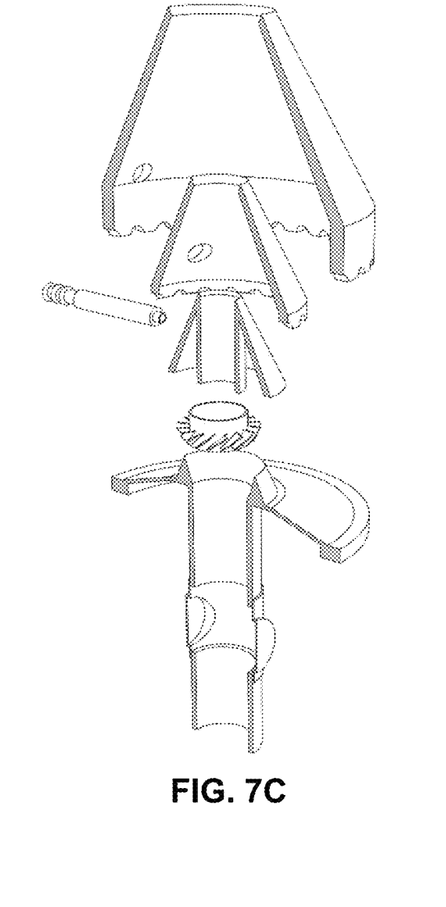
FIG. 7C shows the cross-sectional view of the second embodiment of the device with three cones separated.
Figure 8A:
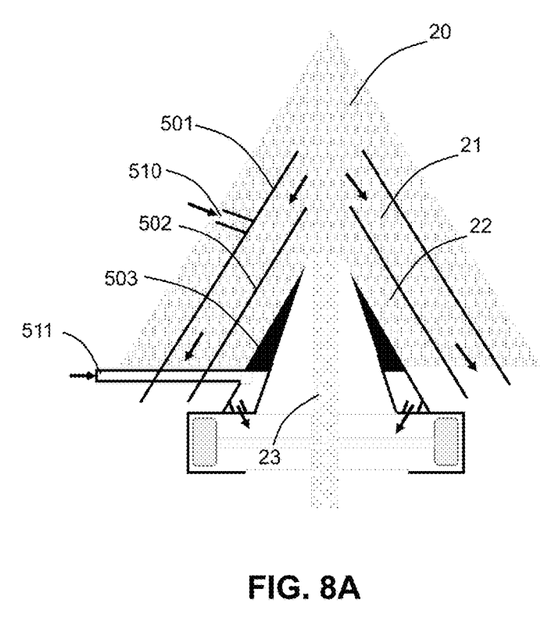
FIG. 8A shows the cross-sectional view of another embodiment of the present device with two swirling flow regions.
Figure 8B:
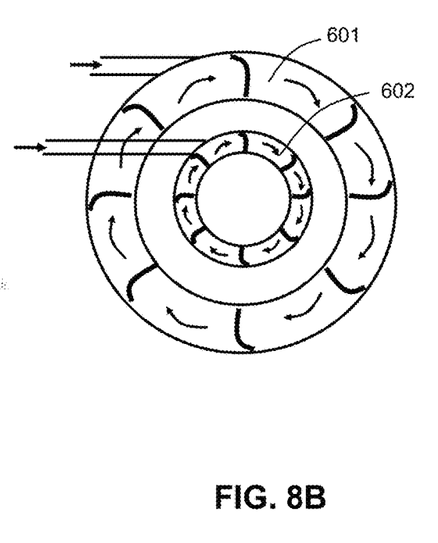
FIG. 8B shows the two swirling regions in between the cones.

The bottom cone 203 is an annular cone, which has an outer surface 203a and an inner surface 203b and an inner open space 203c to receive a flow of air from an inlet 203d. Air 250 enters an air line 260 through an inlet 255 to reach the inner cone inlet 203d. The inlet 203d is set in a tangential position as shown in FIG. 5 to swirl the air flow inside the cone 203. A set of vanes 270 are set at the bottom exit of the cone 203 to further swirl the air and redirect it in the axial direction inside the channel 240. The swirling flow 256 keeps the particles at the center of the flow and forces them to pass through the center of the light beam (laser), thereby increasing the measurement repeatability and accuracy. In addition, the swirling air flow 256 results in a low-pressure region inside the channel causing an air suction from the top opening of the cone.

The swirling air flow not only acts as intake of droplets into the system, but it prevents the drops from colliding the walls of the channel and keeps them at the center of the flow inside the channel. Air that contains liquid droplets and/or solid particles are drawn in from the top opening 211 and leave the system from the bottom opening 212.

Device is set under a spray. The top conical structure of the device allows only a small fraction of the spray to enter the measurement zone. The first largest cone 201 samples a portion of the droplets or particles that can enter through its opening 211. The middle cone 202 is smaller than largest cone 201 and samples a part of the droplets or particles that enter from its opening 213. The remaining part of the particles and droplets leave the device through the openings 217 at the bottom cone 201. Similarly, smallest cone 203, samples only a small fraction of the particles and droplets that can enter through its opening 214 and the remaining material leave through opening 219 at the bottom of the middle close 202.

In the first embodiment, the air line 260 is embedded inside the tubular housing. In another embodiment, as shown in FIGS. 6A. 6B, 7A, 7B and 7C, the air inlet 410 goes through the outer cone 401 and passes through the middle cone 402 from an opening 412 to reach the inner cone 403 through inlet 414. Air can be brought in in other configurations.

In the first embodiment the air swirl is only in the inner cone. Yet, in another embodiment, as shown in FIGS. 8A and 8B, the air is swirled in between the outer and middle cones as well. This will allow a control on how much of the flow that enters the top opening will go through the channel for measurement. Bu increasing the first swirl, the suction pressure can be increased and more flow is separated.

The fluid motion in a vortex creates a dynamic pressure (in addition to any hydrostatic pressure) that is lowest in the core region, closest to the axis, and increases as one moves away from it. The gradient of this pressure forces the fluid to follow a curved path around the axis. In a rigid-body vortex flow of a fluid with constant density, the dynamic pressure is proportional to the square of the distance r from the axis. The dynamic pressure varies as $P_{atm}-k/r^2$, where $P_{atm}$ is the atmospheric pressure and k is a constant. The suction pressure can be increased by increasing the inlet air velocity or pressure. The higher the swirling velocity, the higher the suction. The device can be connect to a compressor to provide air with different pressure. A miniature compressor or a fan can be used to generate the flow.

In one embodiment a set of vanes are set at the exit of the annular cone, in another embodiment a swirl insert is inserted into the annular zone, and air is provided centrally, rather than tangentially, into the annular zone.

The sensing section of the device comprises of a light source 220, preferably a laser and a light detector 230, such as a photo detector. Both the laser source and the detector are housed just below the spray separator. The separated droplets pass directly in front of the laser light and scatter the light onto the detector. The intensity of the attenuated incident beam is used to measure the variation in a line-of-sight laser power intensity. Device uses light extinction signals and interprets them to determine droplet sizes based on a library of calibrated signals. A library of signals is generated by passing droplets with known sizes through a laser beam and measuring the light extinction signals. Signals from passing two droplets through the beam were also tested to identify two signal cases. A matched filter algorithm with wavelet technique is used to rapidly determine the droplet sizes in a dilute spray using the library of calibrated droplet size signals.

Device can measure both liquid droplets and solid particles with any level of opaqueness. In one embodiment of the present device, a collimated/focused laser beam, a 680 nm laser (IR diode, SF6 Gallium Aluminum Arsenide Infrared Emitting Diode) is used that is connected to a power supply driver. The beam output is coupled to a line of sight NPN photo detector.

To characterize the attenuated incident light, it is filtered and analyzed and specific individual droplet size information are extracted. Matched filtering is used to reconstruct the incident particle geometrical dimensions. In order to determine the droplet sizes in the spray, the signals have to be analyzed by comparing them with the calibrated results based on the known droplet measurement. The software maps the scattering cross sections as a function of real-part and imaginary parts of the light extinction to determine the droplet sizes.

The device is remotely connected to a computer, which has a processor to analyze all the signals that are received from the light detectors. In another embodiment, a processor is installed inside the device to analyze all data locally. A monitor installed on the body of the device can show all the particles counts and size distributions for direct reading.

Since the device measure local droplet and particle sizes, a special traverse-stand (not shown) is designed to move the device across a spray. The stand has a traverse system, that can move back and forth in a linear motion. The device is installed on the stand and it is moved to different locations across the spray, held in that location to collect data and then moved to another location. This provides information on the spray size distribution in all regions of the spray. The average of all measurements, represent the average droplet size in the whole spray.

In another embodiment, the swirling cones can be designed to segregate large drops and particles from each other. Generally, larger particle follow their own initial path, whereas smaller particles are more affected by the swirling flow. Therefore, the swirling chambers cab be so designed to segregate small and large particles. Then the small particles can be passed through a set of optics that are designed for their since range and large particle to another set of optics for their sizes. This provides a more accurate measurement device, as well as a method to separate particles of large and small.

The foregoing is considered as illustrative only of the principles of the invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention in regard to size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A liquid droplet and solid particle sensing device to measure a size distribution of particles in a particulate flow or a size distribution of droplets in a spray, the device comprising:

a) a tubular housing having a proximal section and a distal section, wherein the proximal and the distal sections are connected through a sampler section, wherein the sampler section has a channel with an open top and an open bottom to allow for a set of particles to flow through the device without obstruction;

b) a light source held in the proximal section and configured to send a light beam towards the sampler section;

c) a light detector held in the distal section and aligned to receive a set of scattered light signals, wherein said light source being in line with said light detector;

d) an annular cone attached to the open top of the sampler section, wherein the annular cone has a first opening to receive the set of particles, an inner annular space that has a gas inlet and a gas outlet and a swirl flow generator configured to generate a swirling flow inside the channel to keep the set of particle at the center of the channel, wherein the gas inlet is connected to a gas line to supply a gas flow at a predetermined pressure and velocity to control the swirling flow inside the channel, and e) a microprocessor to characterize the scattered light from the set of particles, and to determine the particle sizes passing through the laser beam.

2. The device of claim 1, wherein the swirl flow generator comprises of a tangentially aligned inlet to the annular space of the annular cone.

3. The device of claim 1, wherein the swirl flow generator comprises a set of vanes placed at an exit plane of the annular space of the annular cone.

4. The device of claim 1, wherein the swirl flow generator comprises a swirl insert placed inside the annular space of the annular cone.

5. The device of claim 1, wherein the set of vanes are angled at 30 degrees with respect to a vertical axis.

6. The device of claim 1, further having a compressor to supply the gas line.

7. The device of claim 1, having a first and a second cone placed on top of the annular cone to sample a fraction of the set of particles of the particulate flow or the spray, and wherein the first and the second cone having a set of openings to allow un-sample flow to flow out of the first and the second cones.

8. The device of claim 7, wherein that first cone has a first-cone-gas inlet tangentially aligned to generate a second swirling flow in a space in between the first cone and the second cone, wherein the second swirling flow is adjustable by the inlet gas pressure and velocity, whereby the particle sample can be changed by changing the second swirling flow.

9. The device of claim 1, wherein the particle sizer is configured to measure to measure both liquid droplets and solid particles with any level of opaqueness.

10. The device of claim 1, wherein said light source is selected from a group consisting of a laser, LED, and infrared, and wherein said light detector is selected from a group consisting of photodiodes, phototransistors, photocells, and photomultipliers.

11. The device of claim 1, wherein the processor is configured to determine particle sizes by comparing the output of the photodetector to a predetermined particle size calibration chart.

12. The device of claim 1, directly or remotely connected to a computer or a mobile device to show the particle and spray statistics, comprising of sizes and counts.

13. The device of claim 1, further having a monitor to display particle and spray statistics.

14. The device of claim 1, further having a compressor or a fan to generate the inlet air flow or pressure.

15. The device of claim 1, wherein the multi-cone system is configured to carry an air from a air pressure supply to the annular cone to generate a swirling flow.

16. The device of claim 1, having an outer cone that has an air inlet line.

17. The device of claim 1, having a middle cone that has an air inlet line.

* * * * *